3,100,998
INDICATOR FOR PRESSURE WAVE AMPLITUDES

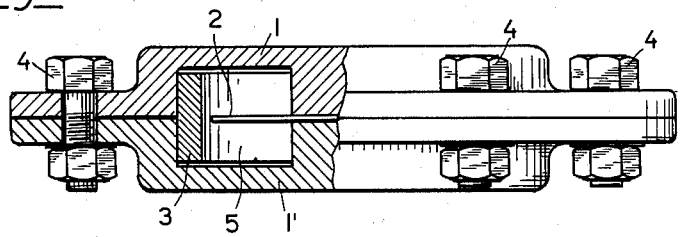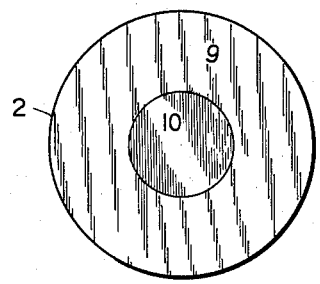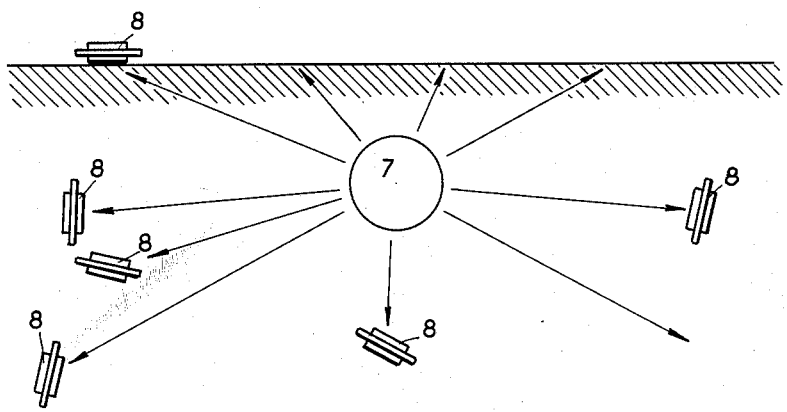
INVENTORS
Ludvík WANIAK, Karel KLÍMA and Jiří VANĚK

Ludvík Waniak, Kunratice, near Prague, and Karel Klíma and Jiří Vaněk, Prague, Czechoslovakia, assignors to Československá akademie věd, Prague, Czechoslovakia
Filed Jan. 2, 1962, Ser. No. 163,731
4 Claims. (Cl. 73—388)

The present invention relates to an indicator of amplitudes of powerful pressure waves, said indicator being adapted for use in the field.

The use of crushers, piezo-electric, tensometric or capacitive indicators for measuring the amplitudes of pressure waves is well known. However, no universally satisfactory indicator has become known, which would be capable of measuring amplitudes of powerful pressure waves produced for instance in the proximity of exploding charges of brisant explosives or heavy mechanical impacts. The existing indicators are not suited for such purposes because of their low mechanical resisting properties. Considering that powerful pressure waves are effective for a very short period of time only, the aforementioned indicators show a further substantial disadvantage in that the measured amplitudes invariably are distorted in the direction to lower values as compared to reality. This discrepancy between the measured and real values is due to the not negligible inertia of the pressure measuring element, since the value of the amplitude is determined according to a static pressure showing the same deformation effect as the pressure wave.

It is an object of the present invention to provide an indicator which eliminates said disadvantages to a substantial degree. Due to its simple design the new indicator has good resisting properties. The pressure element consists of microscopic crystals of silver halogenides contained in a photographic emulsion in which inertia influences are practically negligible. In such a case the values of the amplitudes of powerful pressure waves conform with actual conditions, although they are determined on the basis of a statically equivalent pressure effect. The manufacturing cost of the indicator according to the invention is extremely low when compared with that of the hitherto used instruments. Owing to its qualities the new indicator enables to pick up the amplitude of powerful pressure waves in a large number of points without any difficulties, which is of particular advantage when measuring in actual geological media. The new indicator can serve for the measurement of amplitudes of pressure waves within a range from 750 to 20,000 kg./cm.$^2$, when conventional photographic emulsions are used.

According to the main feature of the invention, the pressure measuring element consists of a photographic emulsion interposed between two resilient, dismountably connected plates. A coaxial annular recess is provided in said plates, a ring being mounted at the outer periphery of said recess; the ring prevents the penetration of light to the photographic emulsion and ensures an exact concentricity of both plates.

The accompanying drawings represent by way of example the new indicator according to the invention and its use.

FIGURE 1 is a diagrammatic cross-sectional view of the assembled indicator,

FIGURE 2 shows the general layout of the measuring operation, and

FIGURE 3 represents the measuring foil with recorded measuring results.

Referring to the drawings, the indicator comprises two plates 1 and 1', each of which is provided with a coaxial annular recess. By joining the two plates 1, 1' in the way shown in FIGURE 1, a free space 5 of annular formation is provided by said recesses between the two plates. Inserted between the plates 1, 1' is a foil 2 coated with photographic emulsion, the free peripheral portion of the foil being accommodated in the free space 5. At the periphery of the space 5 a ring 3 is placed between the plates 1, 1', said ring preventing light from entering the space 5 and serving at the same time for accurate centering of the plates, when they are joined by means of bolts 4.

The pressure indicator is prepared for the measuring operation when both plates 1 and 1' are firmly connected. It should be noted, however, that the foil 2 placed between the plates 1, 1' is clamped by such pressure only as suffices to keep the foil 2 in position and in contact with the plates 1, 1', but does not affect the measured values in any way.

This purpose is achieved by suitably dimensioning the plates 1, 1' so as to provide space for the foil between the opposite central portions of the plates, when the flanges of the plates are firmly connected by means of bolts 4. Alternatively, any suitable spacing means may be used for this purpose.

The pressure wave is transmitted by the medium in which the indicator is placed and through the plate 1 or 1' to the foil 2 coated with photographic emulsion and proceeds further again into the medium, causing a compression of that part of the foil which is placed between the central projections of the plates 1, 1'. The coaxial annular recess or space 5 leaves a part of the emulsion free, with the result that a direct comparison between the properties of the compressed and not compressed emulsion is made possible.

After compression, the foil 2 coated with photographic emulsion is taken out of the indicator and uniformly exposed to light in a suitable apparatus in such a way that the blackening of the not compressed emulsion lies in the upper half of the linear portion of its characteristic curve. The development of the emulsion must be effected under standardized and exactly defined conditions, followed by conventional fixation, washing and drying. On the foil treated in this way the compressed area—due to the plastic deformation of the grain of silver halogenides—will appear as a circle of lighter color (see FIGURE 3). From the difference in blackening between the compressed and not compressed emulsion the value of the amplitude of the pressure wave can be determined on the basis of a known static calibration curve for the type of photographic emulsion used.

In the following disclosure an example of the measuring opeartion carried out with the indicator according to the present invention will be described in greater detail.

Be it assumed, that the measurement of an underground explosion has to be effected. This operation is shown diagrammatically in FIGURE 2 of the drawings. A plurality of indicators 8 is preferably used, said indicators being placed mainly below the level 6 of the ground. The center of explosion is located at a point marked 7. The indicators 8 are placed wherever measurements are to be taken and are turned to such a position with respect to the source of explosion as to be acted upon by that component of the pressure wave amplitude, which has to be measured. Such positioning of the indicators 8 is clearly shown in FIGURE 2, where several indicators are placed below the ground, some are above ground, some are directed with their axes to the center of explosion and some turned to such a position in which their axes form a predetermined angle with the connecting line between the center point of the indicator and the center of the explosion.

The various stages of operation of the new indicator can be summed up as follows:

(1) Insertion of foil 2 into the indicator.
(2) Closing the indicator.
(3) Placing the indicator in position for taking the measurement.
(4) Effecting the measurement, i.e. explosion of the charge, during which the pressure wave causes a desensibilization of the inserted foil 2.
(5) Taking out the foil 2 from the indicator.
(6) Exposing the foil to light.
(7) Developing and fixing the foil under standardized conditions.
(8) Evaluation of the desensibilization by means of an optical densitometer.

The result of the measurement is shown diagrammatically in FIGURE 3. After the foil 2 has been treated in the above described way, there appears, on the one hand, an outer annular portion 9 which has not undergone any compression and, on the other hand, an inner circular portion 10, which has a different optical density. As disclosed above, the value of the pressure wave amplitude which acted on the foil can be determined from the difference in blackening between the compressed portion 10 and the not compressed portion 9.

What we claim is:

1. An indicator of amplitudes of pressure waves comprising in combination two plate-shaped members contacting each other substantially along their borders and light-tightly enclosing a chamber; at least one of said plate-shaped members being resiliently responsive to changes of pressure arising outside said chamber; means detachably securing said plate-shaped members in contacting position; a sheet-like member covered with photographic emulsion and extending within said chamber intermediate said plate-shaped members; a projection extending substantially centrally from at least the resilient plate-shaped member, said projection holding the center portion of the sheetlike member in contact with the other plate-shaped member and adapted to exert pressure upon said center portion when the resilient plate-shaped member is bulged by an outside pressure wave inwardly into the chamber; whereby after removing the sheetlike member from the chamber and developing and fixing the photographic emulsion the arising contrast of opacity on the compressed central portion and on the remaining portion of the emulsion measurably indicates the amplitude of the received pressure wave.

2. An indicator of amplitudes of pressure waves comprising in combination two plate-shaped members contacting each other substantially along their borders and light-tightly enclosing a chamber; at least one of said plate-shaped members being resiliently responsive to changes of pressure arising outside said chamber; means detachably securing said plate-shaped members in contacting position; a sheetlike member covered with photographic emulsion and extending within said chamber intermediate said plate-shaped members; projections extending substantially centrally from each plate-shaped member into the chamber, said projections gripping the center portion of the sheetlike member and adapted to exert pressure thereupon when the resilient plate-shaped member is bulged by a pressure wave inwardly into the chamber; whereby after removing the sheetlike member from the chamber and developing and fixing the photographic emulsion the arising contrast of opacity on the compressed central portion and of the remaining portion on the emulsion measurably indicates the amplitude of the received pressure wave.

3. An indicator of amplitudes of pressure waves as defined in claim 1 and comprising a light-impermeable sealing ring extending within said chamber along the contacting borders of the plate-shaped members to secure the photographic emulsion from any exposure to light.

4. An indicator of amplitudes of pressure waves as defined in claim 2 and comprising a light-impermeable sealing ring extending within said chamber along the contacting borders of the plate-shaped members to secure the photographic emulsion from any exposure to light.

References Cited in the file of this patent

UNITED STATES PATENTS

| 1,772,188 | Mason | Aug. 5, 1930 |
| 1,894,021 | Cornell | Jan. 10, 1933 |
| 2,976,732 | Hautly | Mar. 28, 1961 |
| 2,992,556 | Webster | July 18, 1961 |

OTHER REFERENCES

Pace Engineering Co., publication A12.1, 1 M (2–60).